United States Patent [19]
Turner

[11] Patent Number: 6,021,001
[45] Date of Patent: Feb. 1, 2000

[54] RUGATE INDUCED TRANSMISSION FILTER

[75] Inventor: Aaron N. Turner, Danbury, Conn.

[73] Assignee: Raytheon Company, Lexington, Mass.

[21] Appl. No.: 09/126,332

[22] Filed: Jul. 30, 1998

[51] Int. Cl.[7] .................................. G02B 1/11; G02B 5/28
[52] U.S. Cl. ......................... 359/585; 359/586; 359/588; 359/589
[58] Field of Search .................................. 359/585, 586, 359/588, 589, 590, 359, 360; 372/99, 103

[56] References Cited

U.S. PATENT DOCUMENTS

| | | | |
|---|---|---|---|
| 5,004,308 | 4/1991 | Hall et al. ................................ | 359/359 |
| 5,056,099 | 10/1991 | Bradley ..................................... | 372/99 |

*Primary Examiner*—Jon Henry
*Attorney, Agent, or Firm*—William C. Schubert; Glenn H. Lenzen, Jr.

[57] ABSTRACT

A filter (10) for selectively transmitting electromagnetic energy over a range of frequencies (28, 30, 32) adapted for use with white light (24). The filter (10) includes rugate layers (18, 20) for creating a resonant cavity that resonates at desired bandpass frequencies (28, 30, 32). An absorptive layer (12) absorbs frequencies near the bandpass frequencies (28, 30, 32) and reflects frequencies outside the bandpass frequencies (28, 30, 32). Phase matching layers (14, 16) allow the transmission of electromagnetic energy within the transmission bands (28, 30, 32) through the absorption layer 12. In an illustrative embodiment, the bandpass frequencies (28, 30, 32) comprise the three tristimulus frequencies, i.e., red (28), green (30) and blue (32) frequencies. The rugate layers (18, 20) include first (18) and second (20) rugate layers made of $SiO_2$ and $Ta_2O_5$, respectively. Located between the first (18) and second (20) rugate layers is the absorption layer (12) that is surrounded by the first (14) and second (16) phase matching layers. The absorption layer (12) is a silver layer that is approximately 500 angstroms thick. The first rugate layer (18) has a first index of refraction versus layer thickness profile representing a superposition of sinusoids. Each sinusoid has a frequency directly corresponding to tristimulus band frequency. The second rugate layer (20) has a second index of refraction versus layer thickness profile that is a phase-adjusted version of the first index of refraction versus layer thickness profile. Both rugate layers (18, 20) have index or refraction versus layer thickness profiles have several cycles.

20 Claims, 1 Drawing Sheet

RUGATE INDUCED TRANSMISSION FILTER

BACKGROUND OF THE INVENTION

1. Field of Invention

This invention relates to optical filters. Specifically, the present invention relates to devices for transmitting light of certain wavelengths and blocking light of other wavelengths.

2. Description of the Related Art

Multispectral bandpass optical filters are used in a variety of demanding applications ranging from laser protection glasses to virtual reality imaging applications. Such applications require reliable, durable filters that accurately transmit light of specific wavelengths.

A conventional discrete layer rejection filter includes a stack of optical films, i.e., layers. The indices of refraction of the layers alternate between high and low levels. The alternating indices have a resonating effect on an input light beam resulting in one or more reflection bands, i.e., rejection lines. (A rejection line or reflection band is a portion of the spectrum of the input light that is reflected and not transmitted.)

The stack of layers is called a quarter-wave stack as each layer has an optical thickness of $\lambda\text{hd }o/4$ where $\lambda_o$ is the wavelength of light reflected due to interference resonance. An interference resonance is also produced for input light having wavelengths $\lambda_i$, where $\lambda_i=\lambda_o/m$ for odd values of m. These harmonics result in an undesirable family of rejection lines at progressively shorter wavelengths. In addition, interfaces between the multiple layers are prone to mechanical failure when exposed to high temperatures or mechanical stresses.

In the conventional discrete layer rejection filter, multiple transmission bands, i.e., passbands, occur between strategically placed reflection bands. The reflection bands are placed so that the passbands are centered at the desired passband frequencies. Several quarter wave stacks having different resonant wavelengths are stacked in series to produce multiple passbands between the reflection bands. However, due to the creation of undesirable reflection lines at $\lambda_o/m$ wavelengths, applications requiring extended passbands at wavelengths shorter than the reflection bands are difficult to address. Also, accurate positioning of the multiple passbands is exceedingly difficult due to manufacturing limitations. In addition, as the number and width of the rejection bands increase, so does the thickness and unreliability of the filters. Mechanical stresses at the layer boundaries increase with layer thickness. To increase filter durability, special optical layer materials are used to balance compressive and tensile stresses. This increases the price and decreases the design flexibility of the filters. Still, when exposed to high power lasers, such filters tend to de-laminate at the interfaces between the layers due to differences in thermal expansion coefficients of the layer materials.

A filter that addresses problems associated with very thick optical filters is the induced transmission filter having a thin metallic film. The metallic film is impedance matched with films that are deposited on both sides of the metallic film. The metallic film with the impedance matched layers is then placed between quarter-wave stacks, each layer of the stacks having an optical thickness of $\lambda_o/4$. This results in a passband centered at $\lambda_o$. Dispersion properties of the metallic layer prevent harmonics from forming. However, these filters only operate at a single bandpass wavelength and have relatively poor transmission efficiency.

In another approach known as the rugate approach, the discrete layers used in conventional discrete layer filters are replaced by a continuous layer having an index of refraction that varies through the layer. The index of refraction is varied to produce a profile with the desired optical properties. Such rugate filters are relatively sturdy as the number of abrupt material interfaces are minimized.

To produce broadband filters, i.e., filters having wide rejection bands, two separate rugate filters are stacked together. The edges of the reflection bands of the filters are positioned above and below the desired center of the passband of the broadband filter. Such filters require careful phase-matching of the constituent transmission lines to obtain good transmission in the passband. This can be an expensive and painstaking process. Also, as the passband narrows, successful placement and shaping of the passband becomes increasingly difficult.

A variable period broadband design is disclosed in U.S. Pat. No. 5,475,531 issued Dec. 12, 1995 to A. Turner and T. Rahmlow and entitled BROADBAND RUGATE FILTER, the teachings of which are herein incorporated by reference. In this filter, the frequency of the variation of the index of refraction of the rugates is continuously varied to create the desired optical properties. Narrow bandpass filters are constructed by inducing phase discontinuities in the refractive index profile at points corresponding to the wavelengths at which transmission is desired. This approach however, requires accurate placement of the phase discontinuity which may be difficult in some applications.

Hence, a need exists in the art for a thin, durable filter for selectively transmitting light of multiple specific wavelengths. There is a further need for an accompanying method for accurately and efficiently controlling the placement and width of the passbands.

SUMMARY OF THE INVENTION

The need in the art is addressed by the filter for selectively transmitting electromagnetic energy over a range of frequencies of the present invention. In the illustrative embodiment, the inventive filter is adapted for use with white light and includes rugate films for creating a resonant cavity within the filter that resonates at the desired bandpass frequencies. An absorptive layer absorbs frequencies near the bandpass frequencies and reflects frequencies outside the bandpass frequencies. Phase matching layers allow the transmission of electromagnetic energy within the bandpass frequencies through the absorption layer.

In a specific embodiment, the bandpass frequencies consists of the three tristimulus frequency bands, i.e., red, green and blue frequency bands. The rugate films include first and second rugate films made of $SiO_2$ and $Ta_2O_5$, respectively. Located between the first and second rugate films is the absorption layer that is surrounded by the first and second phase matched layers. The absorption layer is a silver layer that is approximately 500 angstroms thick.

Each rugate film has an index of refraction versus film thickness profile representing a superposition of sinusoids. Each sinusoid has a frequency directly corresponding to a tristimulus band frequency. The second rugate film has a second index of refraction versus film thickness profile that is a phase-adjusted version of the first index of refraction versus film thickness profile. Both rugate films have index or refraction versus film thickness profiles of several cycles.

The inventive system employs a unique method for determining the thickness of a matched layer for use with a rugate induced transmission filter having i passbands corresponding to i wavelengths $\lambda_i$ where i is an integer ranging from 1 to the number of wavelengths to be transmitted, i.e., the number of transmission lines desired. The unique method includes the steps of: letting $W_i=\lambda_i/(2n_F)$ represent the physical thickness of half-waves for each wavelength $\lambda_i$ and corresponding matching layer thickness $t_i$ determined from discrete induced transmission filter design relations; determining a set of integers $\{p_i\}$ such that the variance in a set of values $\{t_i+p_i W_i\}$ is minimized; and selecting the matching thickness to the average of the values $t_i+p_i W_i$ of the set $\{t_i+p_i W_i\}$.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
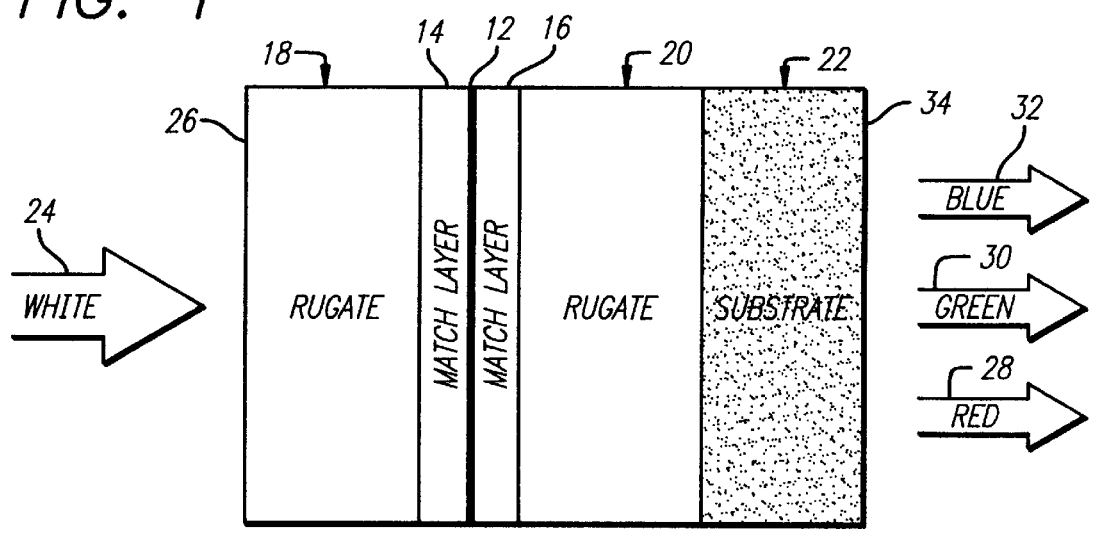
FIG. 1 is a diagram of a tristimulus rugate transmission filter constructed in accordance with the teachings of the present invention.

FIG. 1 is a diagram of a tristimulus rugate transmission filter 10 constructed in accordance with the teachings of the present invention. The filter 10 includes a metallic absorption layer 12 sandwiched between a first matched layer 14 and a second matched layer 16. A first rugate layer 18 is deposited on the first matched layer 14 and a second rugate layer 20 is deposited on the second matched layer 16. The layers 12, 14, 16, 18, 20 are supported by a transparent substrate 22 adjacent to the second rugate layer 20. The layers 12, 14, 16, 18, 20 are deposited sequentially in the following order: 20, 16, 12, 14, 18.

In present specific embodiment, the filter 10 is adapted for use with white light 24 that is input into the filter 10 via a first input aperture 26 on the first rugate layer 18. The index of refraction versus thickness profile (as discussed more fully below) of the filter 10 is designed so that only narrow spatial bands of red light 28, green light 30 and blue light 32 is transmitted through an output aperture 34 in the substrate 22.

The absorption layer 12 is phased matched to the matched layers 14, 16 so that the absorption layer 12 appears non-absorbing at the design wavelengths, i.e., wavelengths corresponding to red 28, green 30, and blue 32 light. The refractive index profiles of the first rugate 18 and the second rugate 20 are designed to anti-reflect with light of the design wavelengths, creating a resonant cavity in which light is reflected back and forth from the second rugate layer 20 to the first rugate layer 18 and through the absorption layer 12 and the matched layers 14, 16.

Light that is well outside the design wavelengths is immediately reflected by the absorption layer 12 as the matched layers 14, 16 are not impedance matched with the absorption layer 12 at wavelengths other than the design wavelengths. Light that is close to the design wavelengths but not within the range of acceptable wavelengths enters the resonant cavity between the first 18 and second 20 rugate films. After repeated passes through the absorption layer 12, the light that is close to the design wavelengths is absorbed by the absorption layer 12. Light at the design wavelengths is not absorbed by the absorption layer 12 and eventually passes through the second rugate layer 20 and out through the substrate 22 via the output aperture 34.

A conventional discrete induced transmission filter (not shown) has a thin metallic layer of index of refraction $z=n_m+ik_m$, (where $n_m$ is the real part of z and $k_m$ is the imaginary part thereof) which is impedance matched at a single wavelength $\lambda_o$ with matched layers of index $n_F$ of thickness $t_F$. The following design relations are characteristic of this discrete induced transmission filter:

$$\mu = \left[ n_m^2 + k_m^2 + n_F^2 + \sqrt{-4n_m^2 n_F^2 + (n_m^2 + k_m^2 + n_F^2)^2} \right] / (2n_m) \quad [1]$$

$$\tan\left(\delta - \frac{\pi}{2}\right) = \frac{k_m n_F}{n_F^2 - \mu n_m} \quad [2]$$

$$t_f = \frac{\lambda_0 \delta}{2\pi n_F} \quad [3]$$

where $\delta$ is the optical phase thickness of the matching layers and $\mu$ is a substitution variable. $t_F$ is obtained by first solving for $\mu$ in equation [1]; substituting $\mu$ into equation [2]; solving equation [2] for $\delta$; substituting $\delta$ into equation [3]; and solving equation [3] for $t_F$.

This metallic layer surrounded by the matched layers has an equivalent non-absorbing index of refraction, which is then placed between quart-wave stacks. The net effect is an antireflection coating that does not block light of wavelength $\lambda_o$ blocks light at all other wavelengths.

In the transmission filter 10 of the present invention, the matching layer 14, 16 thickness is chosen such that the metallic layer 12 is approximately impedance matched at multiple wavelengths corresponding to the desired locations of the passbands. In the present specific embodiment, these wavelengths are tristimulus wavelengths, i.e., red, green and blue wavelengths, and the thickness of the metallic layer 12 is approximately 500 angstroms. The thickness of the rugate layers 18, 20 are determined by the number of rugate cycles in the layers 18, 20, which, in turn, is determined through cycle optimization (as discussed more thoroughly below).

The present invention employs a unique method for determining the thickness of the matched layers 14, 16 for selectively transmitting light having a set of wavelengths $\{\lambda_i\}$, where i is an integer ranging from 1 to the number of wavelengths to be transmitted, i.e., the number of transmission lines desired. For example, in the present specific embodiment, $\{\lambda_i\}=\{\lambda_1, \lambda_2, \lambda_3\}$ where $\lambda_1$=the wavelength of red light, $\lambda_2$=the wavelength of green light, and $\lambda_3$=the wavelength of blue light. Each wavelength $\lambda_1$ corresponds to the center of the corresponding transmission band. For example, $\lambda_1$ corresponds to the center of the band of wavelengths corresponding to red light.

For the set of wavelengths $\{\lambda_i\}$, let $t_i$ be the matching thickness for each $\lambda_i$ determined from equations [1]–[3]. Let $W_i=\lambda_i/(2n_F)$ be the physical thickness of half-waves for each $\lambda_i$, where $n_F$ is the index of refraction of the matched layers. Determine a set of integers $p_i$ such that the variance in $t_i+p_i W_i$, i.e., the square of the standard deviation of $(t_i+p_i W_i)$ is minimized. Then select the matching thickness to the average of the set of values $\{t_i+p_i W_i\}$. To construct the transmission filter 10 of the present invention, the structure corresponding to the metallic layer 12 and matched layers 14, 16 is surrounded by the multi-line rugates 18, 20, with the lines centered at the desired passband wavelengths $\lambda_i$.

The thickness of the matched layers 14, 16 may be refined to be approximately the least common multiple of the theoretical matching layer thickness (determined via equations [1]–[3]) scaled by the ratio of the experimentally determined matching layer thickness to the theoretical matching layer thickness.

The rugate filter 10 of the present invention provides superior design flexibility over conventional induced transmission filters. For example, the present invention facilitates producing multiple passbands and allows for easy tuning of the width and amplitude of the passbands by simply adjusting the amplitude of the refractive index profiles of the rugate layers 18, 20 and by adjusting the number of cycles of the rugate refractive index profiles (as discussed more fully below).

Suitable materials for constructing the rugate layers 20, 26 for an illustrative example include SiO2 and $Ta_2O_5$. Rugate layer construction with these materials is well known in the art. A suitable material for the metallic absorption layer 12 is silver. A suitable material for the matched layer is $Ta_2O_5$.

The filter 10 is at least a factor of ten thinner than its conventional broadband rugate counter part. As a result, the transmission filter of the present invention is a more durable, space-efficient filter.

Figure 2:
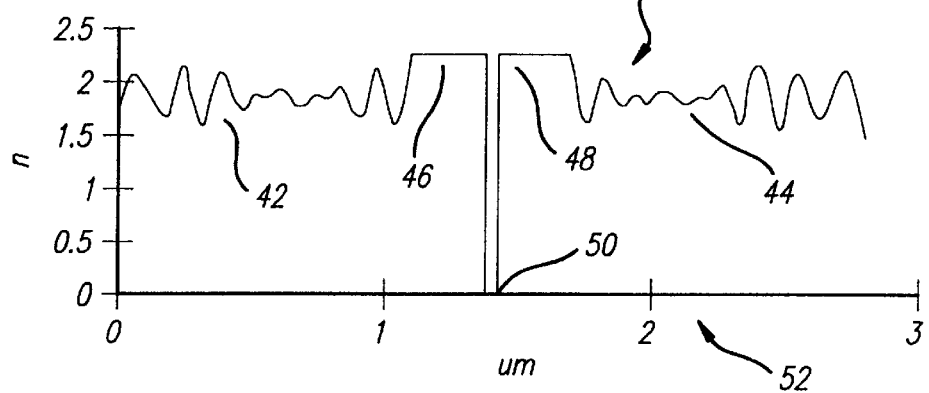
FIG. 2 is a graph of index of refraction versus thickness for the rugate transmission filter of FIG. 1.

FIG. 2 is a graph 40 of index of refraction versus thickness for the rugate transmission filter 10 of FIG. 1. The index of refraction versus thickness graph 40 has a first rugate refractive index section 42, a second rugate section 44, a first constant section 46, a second constant section 48, and a complex section 50 corresponding to the first rugate layer 18, the second rugate layer 20, the first matched layer 14, the second matched layer 16, and the absorption layer 12 of FIG. 1 respectively.

In the first rugate section 42 and the second rugate section 44, the index of refraction of the corresponding rugate film continuously varies with depth as represented by the horizontal axis 52 of the graph 40. These rugate patterns 42, 44 represent the superposition of three sinusoidal patterns, each sinusoidal pattern for reflecting red, blue, and green light respectively. The amplitude of each individual sinusoidal component is adjusted to achieve a desired transmission bandwidth. Each sinusoidal component has a frequency that matches a frequency passed by the filter, which corresponds to either a red, green or blue frequency.

The sinusoidal components that comprise the first rugate section 42 have different phase inter-relationships than the sinusoidal components of the second section 44. The phase inter-relationships between the sinusoidal components in each rugate section 42, 44, are determined using rugate design software which may be readily developed by those ordinarily skilled in the art. The components are shifted with respect to each other by multiples of 90 degrees. For example the three sinusoidal components for the first rugate section 42 may have phases represented by 0°, 90°, and 270°; the second rugate section 44 may have sinusoidal components having phases represented by 0°, 0°, and 90°.

The amplitudes of the rugate sections 42, 44 vary in accordance with the sum of the three corresponding sinusoidal components. For each rugate section 42, 44, amplitude optimization is performed on the amplitudes of the constituent components. Amplitude optimization, in accordance with the present invention, includes establishing the physical limit on the amplitude of summation of the components; adjusting the amplitude of each component until a balance is reached between transmission efficiency at the transmit frequencies (red, green and blue) and transmission line width suitable for the given application for which the filter will be used. This amplitude optimization method may be implemented with rugate filter design software or by direct analysis and/or experimentally.

The complex section 50 corresponds to the metallic absorption layer 12 of FIG. 1. The index of refraction has a real component that is small compared to the imaginary component. The real component here is shown to have a value close to zero.

In the present embodiment, indices of refraction of the first section 46 and the second section 48 are constant and are set to the highest index of refraction values used in the associated rugate sections 42, 44, respectively.

The number of cycles of the constituent sinusoidal components of the rugate sections 42, 44 determine the thickness of the corresponding rugate films. The optimum number of cycles for each constituent component is determined experimentally.

In the present specific embodiment, the first rugate refractive index section 42 has a profile n(t) that varies with film thickness (t) in accordance with the following equation:

$$n(t)=1.88+0.1 \sin[(4\pi1.88t)/\lambda_1]+0.15 \sin[(4\pi1.88t)/\lambda_2-\pi/2]+0.15 \sin[(4\pi1.88t)/\lambda_3-\pi/2] \quad [4]$$

where $\lambda_1$, $\lambda_2$, and $\lambda_3$ correspond to the three wavelengths of light to be transmitted such as red, green and blue light.

The second rugate section 44 has a profile n(t) that varies with film thickness (t) in accordance with the following equation:

$$n(t)=1.88+0.1 \sin[(4\pi1.88t)/\lambda_1+\pi/2]+0.15 \sin[(4\pi1.88t)/\lambda_2+\pi]+0.15 \sin[(4\pi1.88t)/\lambda_3+\pi/2] \quad [5]$$

where $\lambda_1$, $\lambda_2$, and $\lambda_3$ correspond to the three wavelengths of light to be transmitted such as red, green and blue light.

The first constant section 46 and the second constant section 48 are approximately 0.2856 $\mu$m thick. The complex section 50 is approximately 0.05 $\mu$m thick.

Figure 3:
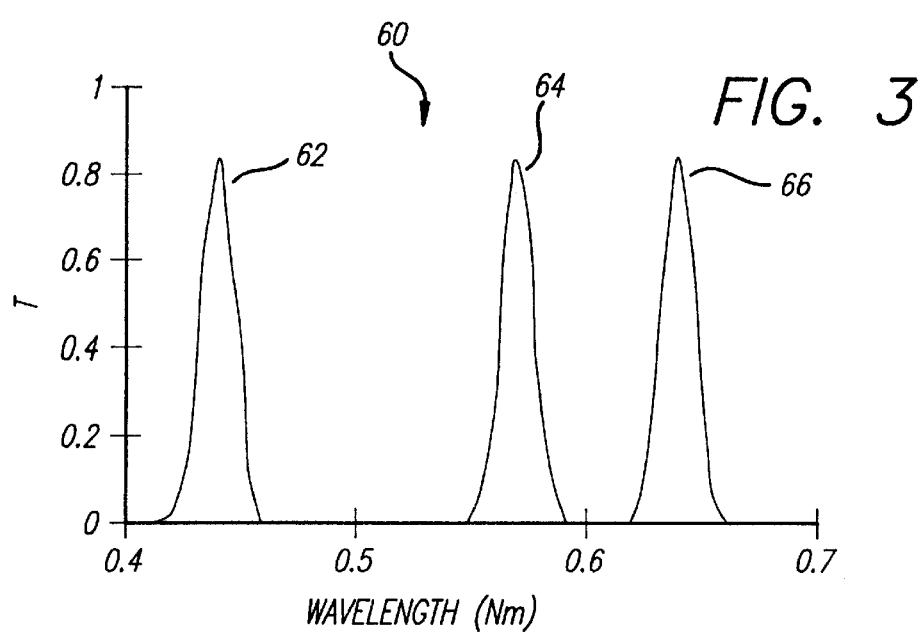
FIG. 3 is a graph of transmission efficiency versus wavelength for the output of the rugate transmission filter of FIG. 1 when the input is white light.

FIG. 3 is an idealized graph 60 of transmission efficiency versus wavelength for the output of the rugate transmission filter of FIG. 1 when the input is white light. The intensity versus wavelength graph 60 includes a first peak 62 corresponding to red light followed by a second peak 64 corresponding to green light, followed by a third peak 66 corresponding to blue light. The peaks 62, 64, and 66 lack transmission line ripples often characteristic of conventional induced transmission filters and have high transmission efficiencies.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A filter for selectively transmitting electromagnetic energy over a range of frequencies comprising:
   first means for creating a resonant cavity for electromagnetic energy having frequencies within one or more passbands, said first means including first and second rugate layers;
   second means for blocking electromagnetic energy having frequencies outside of said one or more passbands; and third means for transmitting electromagnetic energy having frequencies within said one or more passbands through said second means.

2. The invention of claim 1 wherein said electromagnetic energy is light.

3. The invention of claim 1 wherein said one or more passbands comprise three passbands corresponding to red green and blue frequency bands.

4. The invention of claim 1 wherein said first and second rugate layers include $SiO_2$ and $Ta_2O_5$ materials.

5. The invention of claim 1 wherein said second means is surrounded by said third means and disposed between said first and second rugate layers.

6. The invention of claim 5 wherein said second means is a layer of silver.

7. The invention of claim 6 wherein said layer of silver is approximately 500 angstroms thick.

8. The invention of claim 1 wherein said third means includes first and second matched layers disposed between said second means and said first rugate layer and between said second means and said second rugate layer, respectively.

9. The invention of claim 8 wherein said first and second matched layers are impedance matched with said second means at frequencies corresponding to said one or more passbands.

10. The invention of claim 8 wherein said first and second matched layers are phase matched with said first and second rugate layers so that said second means is non-absorbing at frequencies corresponding to said one or more passbands.

11. The invention of claim 1 wherein said first rugate layer has a first index of refraction versus layer thickness profile representing a superposition of sinusoids.

12. The invention of claim 11 wherein said first index of refraction versus layer thickness profile (n(t)) varies with film thickness (t) in accordance with the following equation:

$$n(t)=1.88+0.1 \sin[(4\pi 1.88t)/\lambda_1]+0.15 \sin[(4\pi 1.88t)/\lambda_2-\pi/2]+0.15 \sin[(4\pi 1.88t)/\lambda_3-\pi/2]$$

where $\lambda_1$, $\lambda_2$, and $\lambda_3$ represent a range of wavelengths corresponding to said range of frequencies.

13. The invention of claim 11 wherein each sinusoid has a frequency directly corresponding to one of said one or more passbands.

14. The invention of claim 11 wherein said second rugate layer has a second index of refraction versus layer thickness profile.

15. The invention of claim 14 wherein said second index of refraction versus layer thickness profile is a phase-adjusted version of said first index of refraction versus layer thickness profile.

16. The invention of claim 15 wherein said first index of refraction versus layer thickness profile (n(t)) varies with film thickness (t) in accordance with the following equation:

$$n(t)=1.88+0.1 \sin[(4\pi 1.88t)/\lambda_1+\pi/2]+0.15 \sin[(4\pi 1.88t)/\lambda_2+\pi]+0.15 \sin[(4\pi 1.88t)/\lambda_3+\pi/2]$$

where $\lambda_1$, $\lambda_2$, and $\lambda_3$ represent a range of wavelengths corresponding to said range of frequencies.

17. The invention of claim 14 wherein said first and second index or refraction versus layer thickness profiles have several cycles.

18. A filter for selectively transmitting electromagnetic energy over a range of frequencies comprising:

an input aperture for receiving electromagnetic energy;

means for creating a resonant cavity for electromagnetic energy having frequencies within a desired passband, said means for creating including a rugate layer and an absorptive layer; and an output aperture for outputting said electromagnetic energy having frequencies within said passband.

19. An optical filter for transmitting electromagnetic energy of desirable frequencies and blocking or reflecting electromagnetic energy of other frequencies comprising:

a first rugate layer having an index of refraction versus layer thickness profile represented by a first function, said first function generating a first reflective resonance with said electromagnetic energy of desirable frequencies, said first rugate layer receiving input electromagnetic energy;

a second rugate layer having an index of refraction versus layer thickness profile represented by a second function, said second function generating a second reflective resonance with said electromagnetic energy of desirable frequencies;

an absorption layer for absorbing said electromagnetic energy of other frequencies;

matched layer means disposed between said absorption layer and said first rugate layer and said second rugate layer for adjusting the impedance of said absorption layer in accordance with said first and second functions so that a portion of said electromagnetic energy of desirable frequencies is not absorbed by said absorption layer; and cavity means for directing said portion of electromagnetic energy through said absorption layer and then outputting said portion through said second rugate layer, said portion reflected from said first resonance and second resonance.

20. A filter for selectively transmitting electromagnetic energy over a range of frequencies comprising:

a first material having a continuously varying index of refraction;

a second material having a continuously varying index of refraction;

a third layer between said first and second layers having a constant index of; refraction;

a fourth layer having a constant index of refraction; and a fifth layer between said third layer and said fourth layer having a complex index of refraction.

* * * * *